United States Patent [19]

Irelan et al.

[11] 4,448,453
[45] May 15, 1984

[54] APPARATUS AND METHOD FOR RAISING AND LOWERING BOTH ROOF AND SIDE WALLS OF A RECREATIONAL VEHICLE

[75] Inventors: John A. Irelan, Elkhart, Ind.; William E. Peterson, Harmony, Minn.

[73] Assignee: Coachmen Industries, Inc., Middlebury, Ind.

[21] Appl. No.: 395,609

[22] Filed: Jul. 6, 1982

[51] Int. Cl.³ .............................................. B60P 3/34
[52] U.S. Cl. .......................................... 296/27; 52/66
[58] Field of Search ................ 296/27, 26, 173; 52/66

[56] References Cited

U.S. PATENT DOCUMENTS

| | | | |
|---|---|---|---|
| 3,050,331 | 8/1962 | Mansen | 52/66 |
| 3,397,007 | 8/1968 | Scheid | 296/27 |
| 3,495,866 | 2/1970 | Bontrager | 296/27 |
| 3,558,181 | 1/1971 | Peterson | 296/27 |
| 3,560,042 | 2/1971 | McCarthy | 296/27 |
| 3,924,889 | 12/1975 | Gogush | 52/66 |
| 3,941,415 | 3/1976 | Cooper | 296/27 |

*Primary Examiner*—Robert R. Song
*Attorney, Agent, or Firm*—James D. Hall

[57] ABSTRACT

In a recreational vehicle (10) a pair of pivotally mounted solid wall panels (16,18) which are selectively power (40) actuated by two pairs of operating levers, (19a,18a,16a,18a) between horizontal transit position and upright in-use position, a roof (20) which is raisable and lowerable between transit and in-use positions by compound linkages (144,146) connected one to each of the corners (140) of the roof (20) and at the opposite end (150) to a mid portion of the associated operating lever. There is thus coordinated by a single power actuating means (40) the concurrent hinge movements of the wall panels (16,18) and rectilinear vertical movement of the roof (20).

9 Claims, 13 Drawing Figures

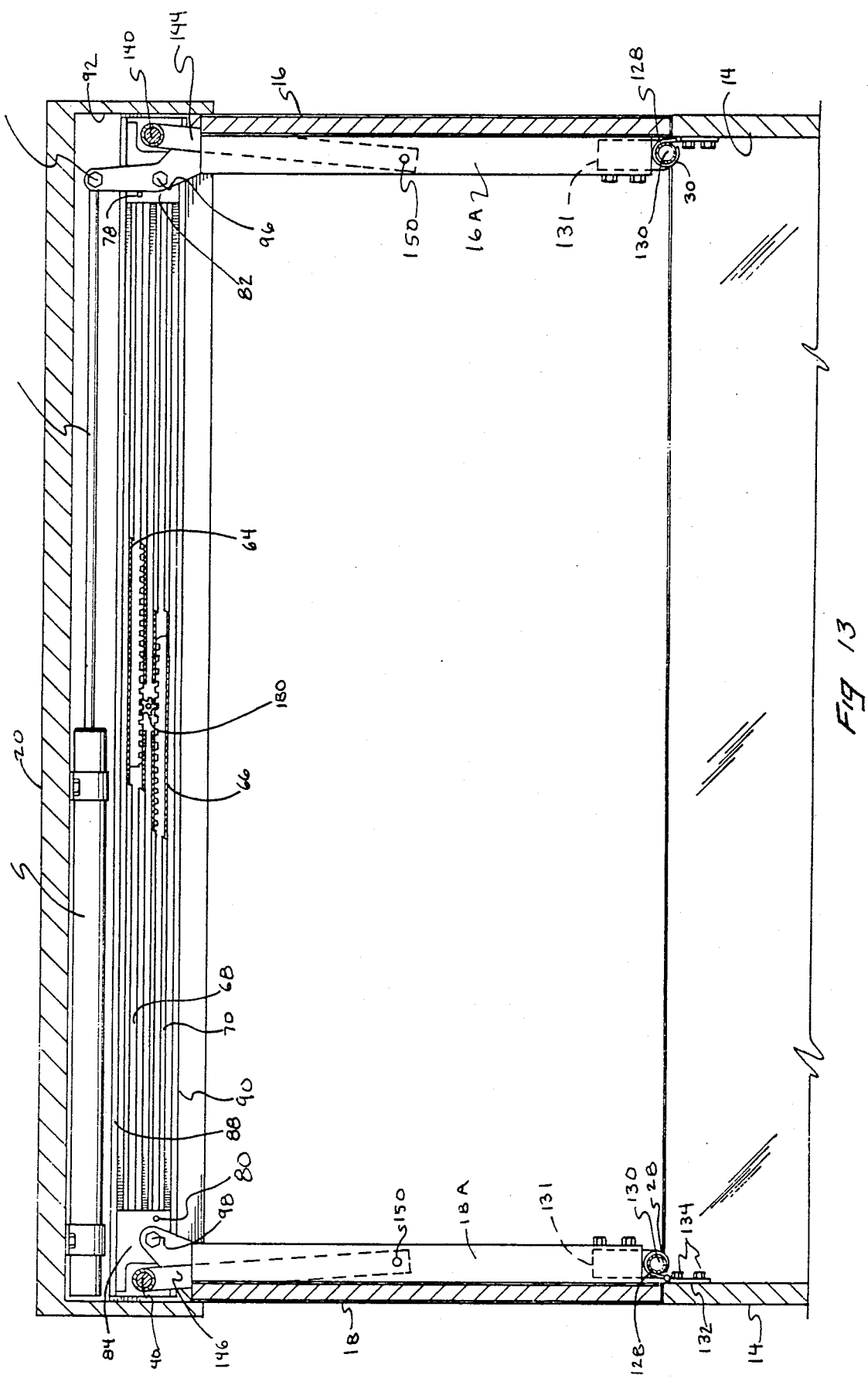

APPARATUS AND METHOD FOR RAISING AND LOWERING BOTH ROOF AND SIDE WALLS OF A RECREATIONAL VEHICLE

DESCRIPTION

1. Field of the Invention

This invention relates to both hand-operated and power-operated actuating means for simultaneously raising or lowering both the roof and side walls of a recreational vehicle. The apparatus and method utilize a combination of actuation linkages attached to both roof and side walls and which are operated essentially from a single location. The linkages operate in unison and without binding to cause the roof-and-wall structure to be lowered into a compact transport position or raised so that the recreational vehicle is in a condition for use.

2. Description of the Prior Art

The concept of providing a collapsible recreational vehicle in which both the roof and side walls are of solid construction, is disclosed in Knudsen, U.S. Pat. No. 3,632,153 "Hard Panel Fold-out Bunk Shelter" issued Jan. 4, 1972. In this patent disclosure the wall panels are hinged longitudinally at their midsection to enable them to collapse inwardly or to be folded out into a perpendicular position. Simultaneous with such wall panel movement, the roof is raised or lowered.

In Peterson, U.S. Pat. No. 3,884,520 "Drive Mechanism for Collapsible Camping Vehicles" issued May 20, 1975, there is illustrated a drive mechanism for extending the sides of a camping vehicle and raising a roof simultaneously.

This patent does not provide for solid wall panels to be raised and lowered between vertical and horizontal positions.

Peterson U.S. Pat. No. 3,558,181 "Collapsible Tent Trailers" issued Jan. 26, 1971 discloses a raisable and lowerable roof structure but the side walls are made of flexible fabric such as canvas.

SUMMARY OF THE INVENTION

The improved procedure of the present invention lies in the novel combination of leverage mechanism and actuating mechanism which enables simultaneous raising of two side walls from a folded in-transport position to an upright use position and simultaneously raising the roof of the recreational vehicle which is carried by the leverage mechanism. The actuating mechanism can be carried in the interior surface of the roof. Conversely, the operation can be reversed by counter-actuation of the drive mechanism so that the solid side wall panels at the opposite sides of the vehicle are simultaneously folded inwardly and the roof section lowered. As a result, the recreational vehicle as a whole is compact and easily transportable and is functionally superior in its use of solid side panels. It has been found that attempting to carry out the described raising and lowering functions especially with solid state structured members, and through a single mechanical drive mechanism is highly challenging. The raising and lowering mechanism must operate smoothly and yet must have a degree of precision in operation so that the raising and lowering functions of the roof, together with the pivotal movement of the side walls is precisely coordinated. Should any portion of the raising and lowering linkage mechanism advance ahead of any other portion, the result can easily cause such binding that the operating system becomes stuck and the operating linkages are no longer free to move responsively to raising or lowering actuating efforts.

Another important concept in the raising and lowering functions of the side walls and roof of a recreational vehicle is that the device must be light weight, and as unobtrusive as possible. Quite obviously, in a recreational vehicle thrifty and efficient use of space is an absolute necessity. Moreover, the wall-and-roof structure which has directly associated with it the actuating mechanism and operating linkages, must not interfere with other features of the recreational vehicle, such as pull-out bunk sections which extend outwardly from the forward and rear end of the recreational vehicle once the walls are raised and the roof is elevated to provide the necessary head room.

What the art has needed over a long period of time, and has notably lacked, is a combination power actuator and system of lift linkages for raising and lowering a roof structure and further simultaneously pivoting a set of solid panel side walls, such simultaneous operations being closely coordinated to preclude binding and lockup. When the linkages are fully lowered or fully raised, they must remain in operative position, i.e. the power mechanism must not be precluded from carrying out its raising and lowering functions because the operating linkages become locked in place. Thus, the mechanical linkage system at one side of the vehicle must be coordinated with mechanical linkages at the opposite side of the vehicle by a system of power take-off shafts which insure an even, coordinated and simultaneous folding action of the walls and concurrent vertical movement of the roof section.

This is more difficult than it appears since the wall and roof sections describe wholly different lines and character of movement, e.g. the walls are moved angularly and the roof rectilinearly, yet both must proceed from a single panel actuator acting through a set of mechanical linkages. Upon full retraction the side wall panels and roof must assume positions in which the operating mechanism can easily reverse the wall-infolding and roof lowering action and without encountering lockup of the raising-and-lowering mechanism.

Operating mechanisms of the type described and their follower linkages tend to be overweight and cumbersome. This is owing in part to the fact that the mechanism is mounted at the base rather than in the roof structure. One of the important features of the present invention is that the operating mechanism and the force input that it generates to operate linkages, is mounted in the interior perimeter of the roof section where it is possible to more efficiently coordinate the movements of the operating linkage and with far less input effort, all of which contributes to a more efficient, light-weight and practical mechanism.

A BRIEF DESCRIPTION OF THE DRAWINGS

Figure 5:
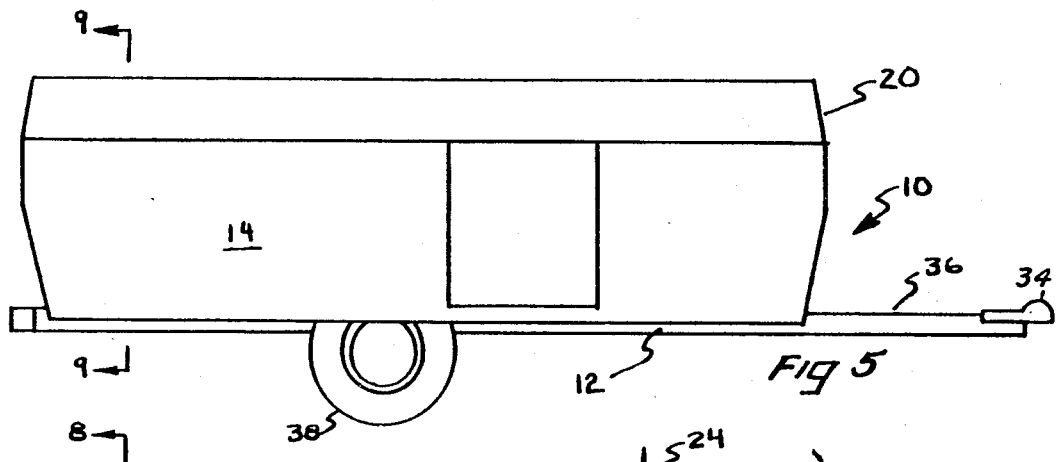
FIGS. 5 and 6 are the same views as FIGS. 1 and 2 but with the side walls fully retracted by inward folding action and with the roof completely lowered.
Figure 3:
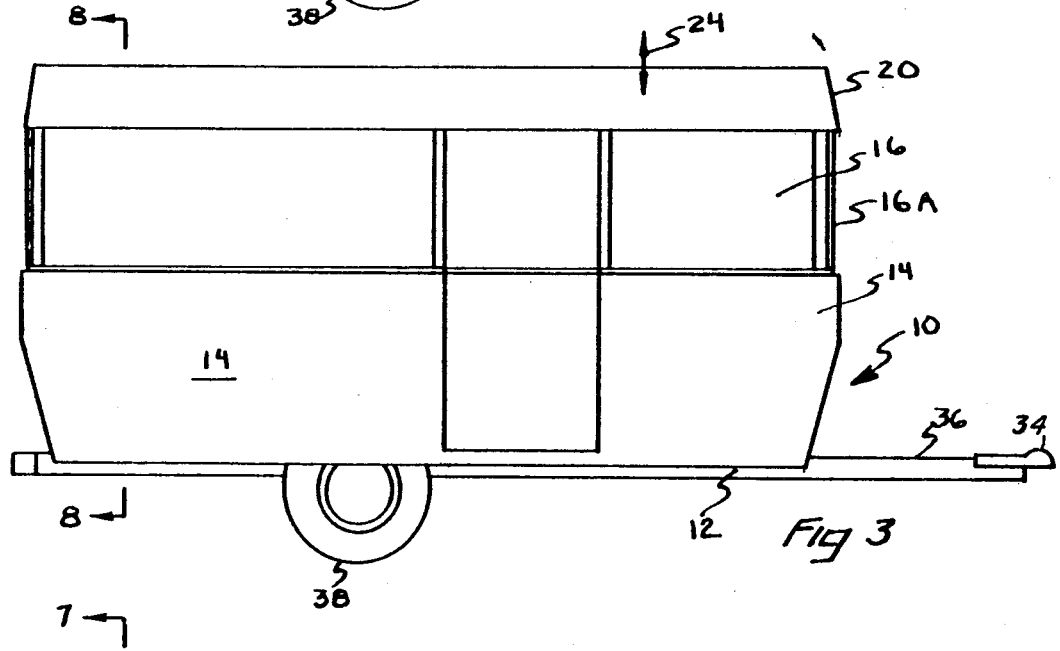
FIGS. 3 and 4 are the same views as FIGS. 1 and 2 but showing the roof partially lowered and the side wall panels folded partially inwardly.
Figure 2:
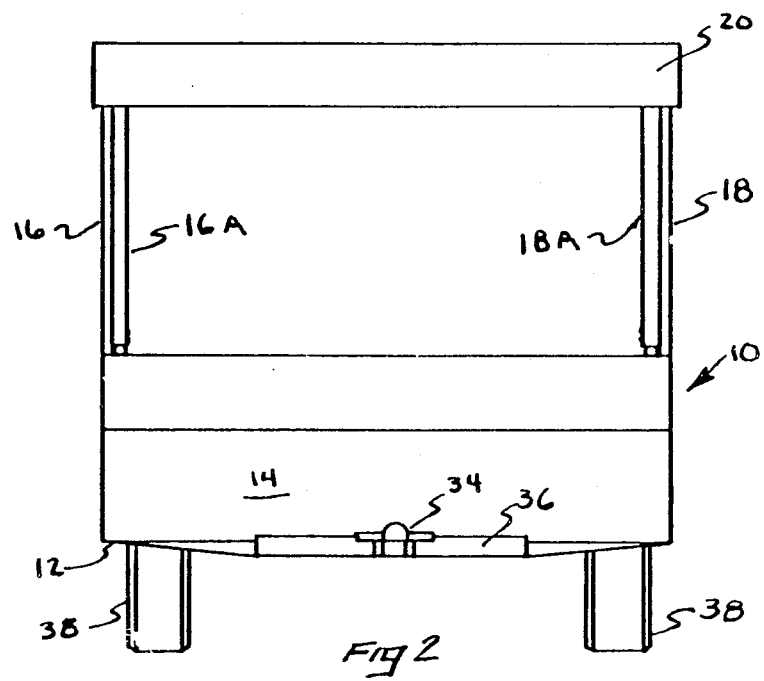
FIG. 2 is an end view of FIG. 1 viewed from the right hand side of FIG. 1.
Figure 7:
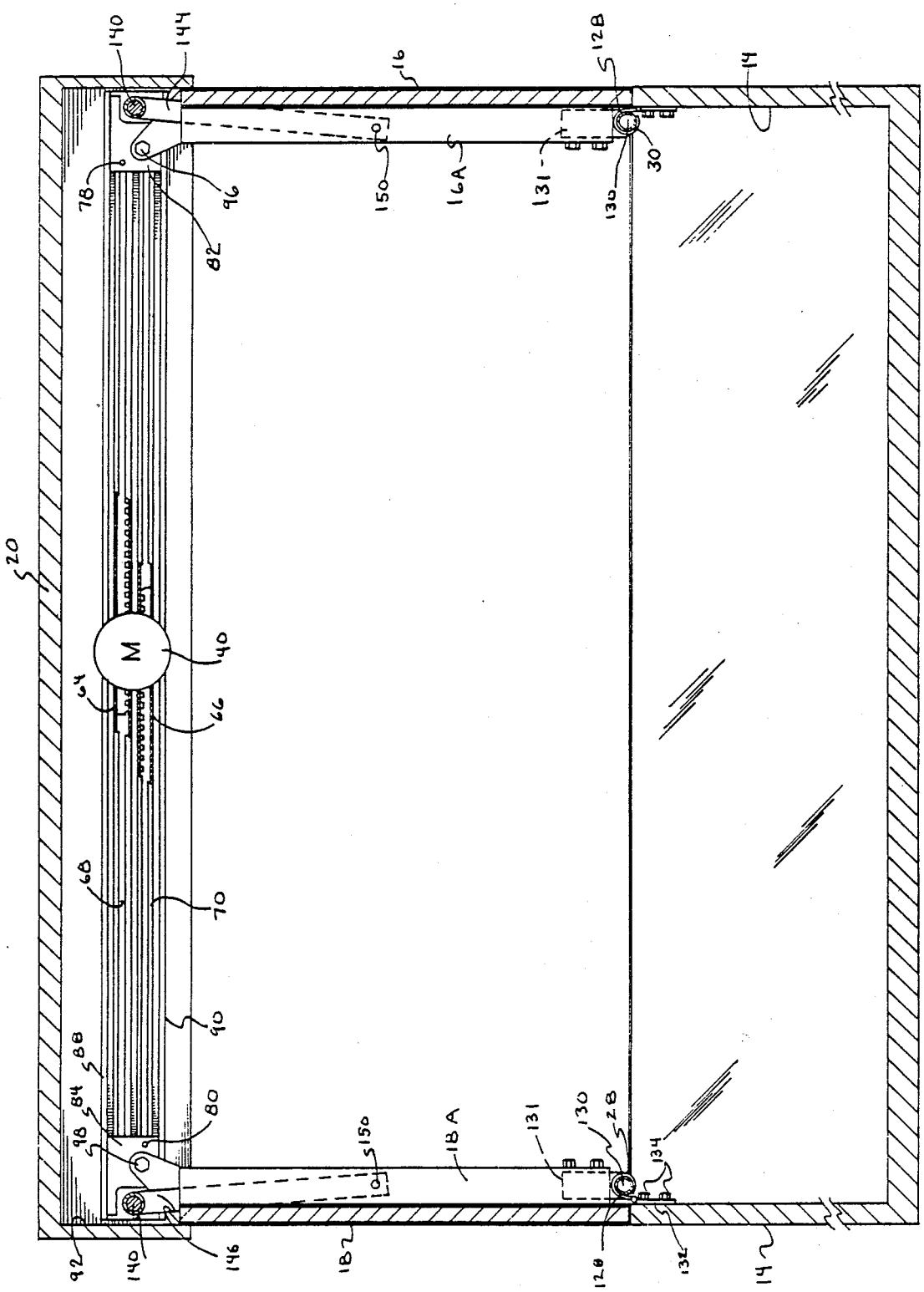
Figure 8:
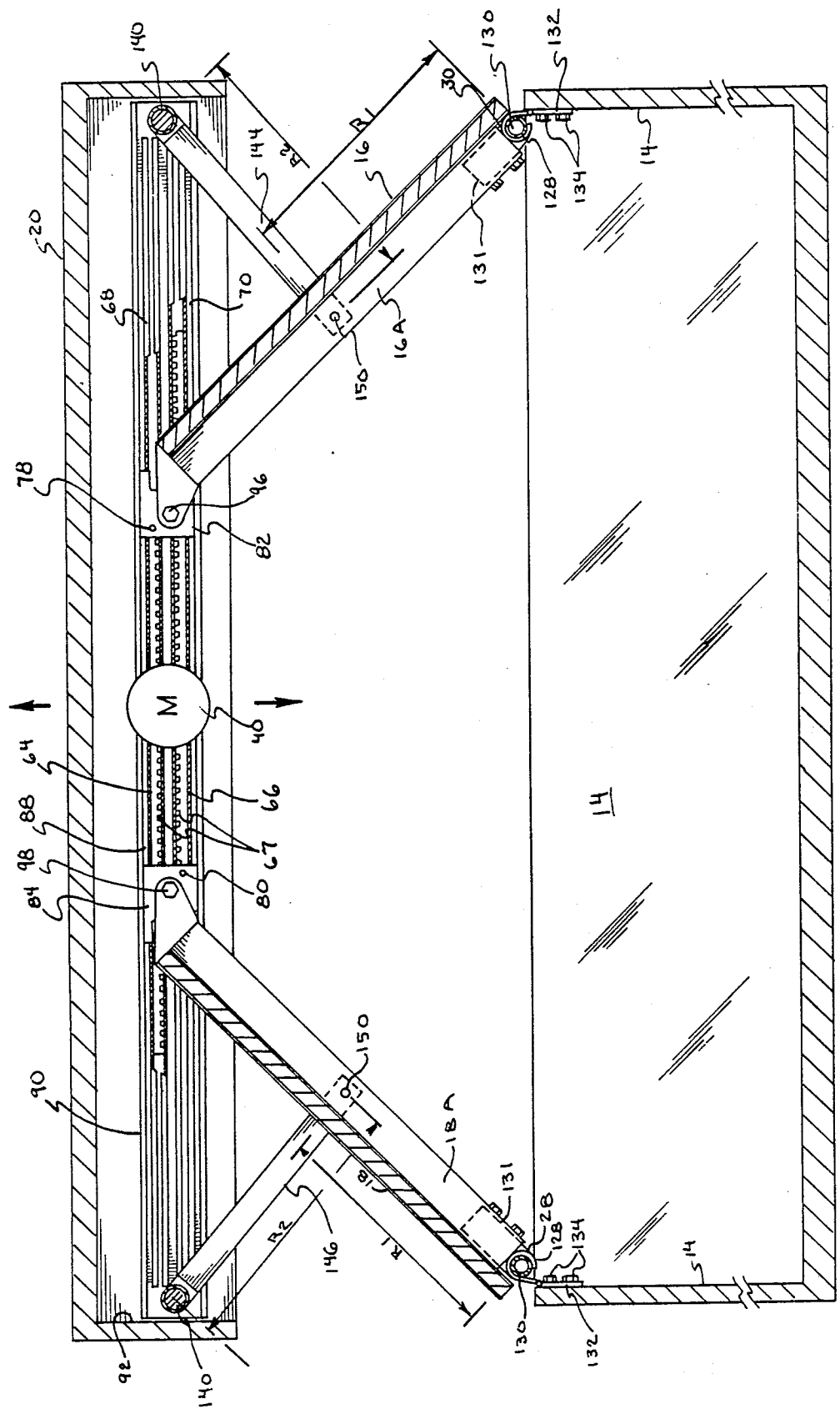
Figure 9:
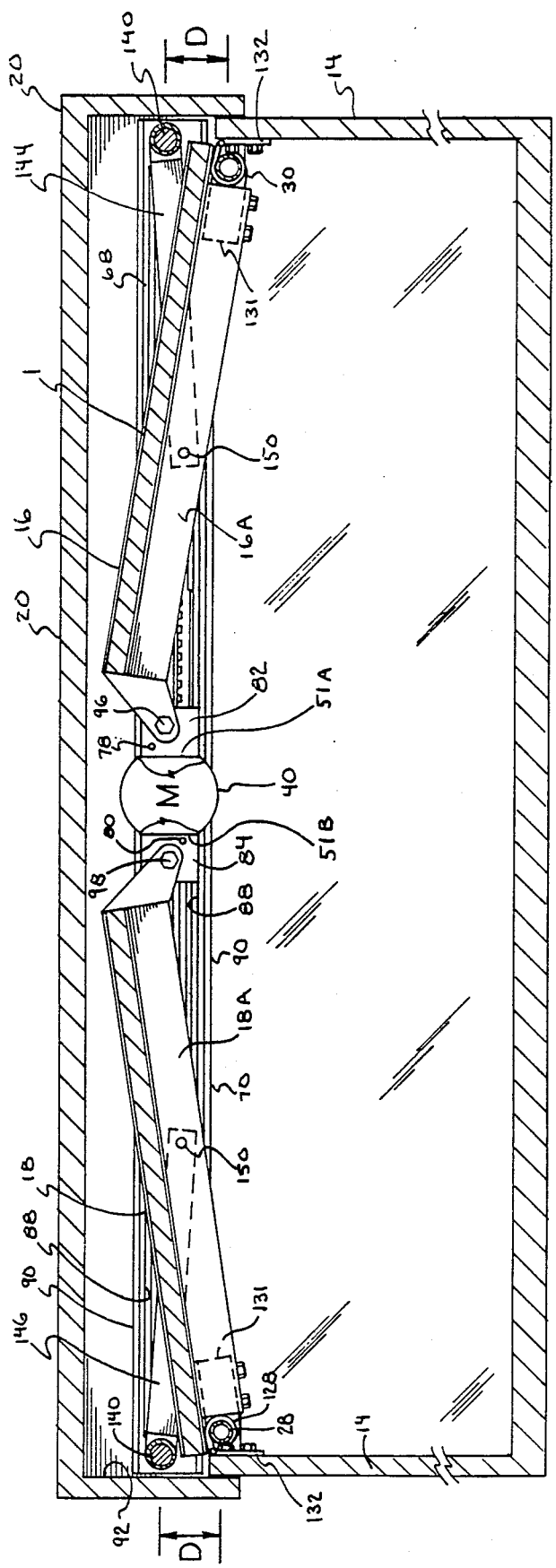

FIGS. 7, 8 and 9 are progressive views taken on section lines 7—7, 8—8 and 9—9 of FIGS. 2, 3 and 5.

Figure 10:
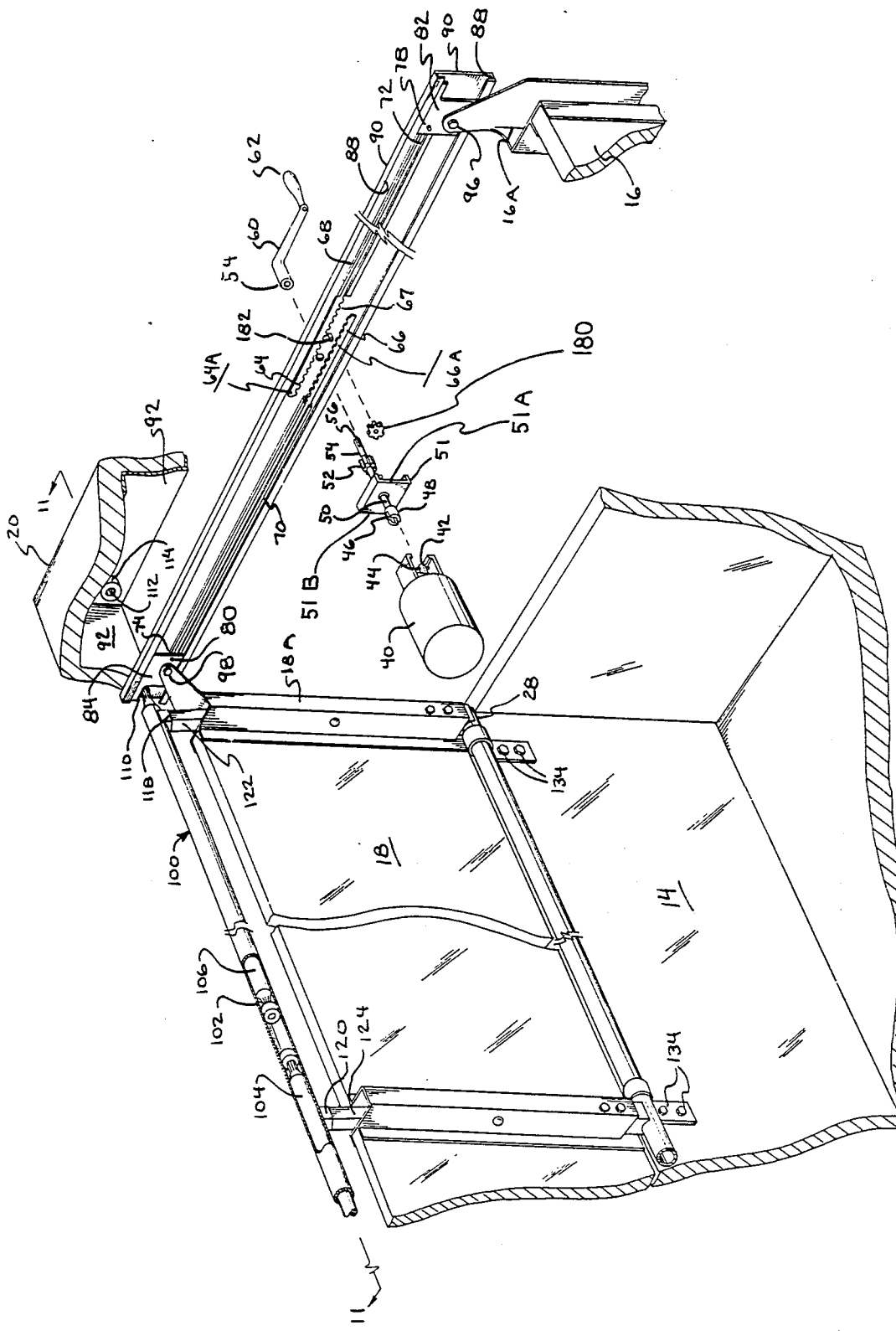
Figure 11:
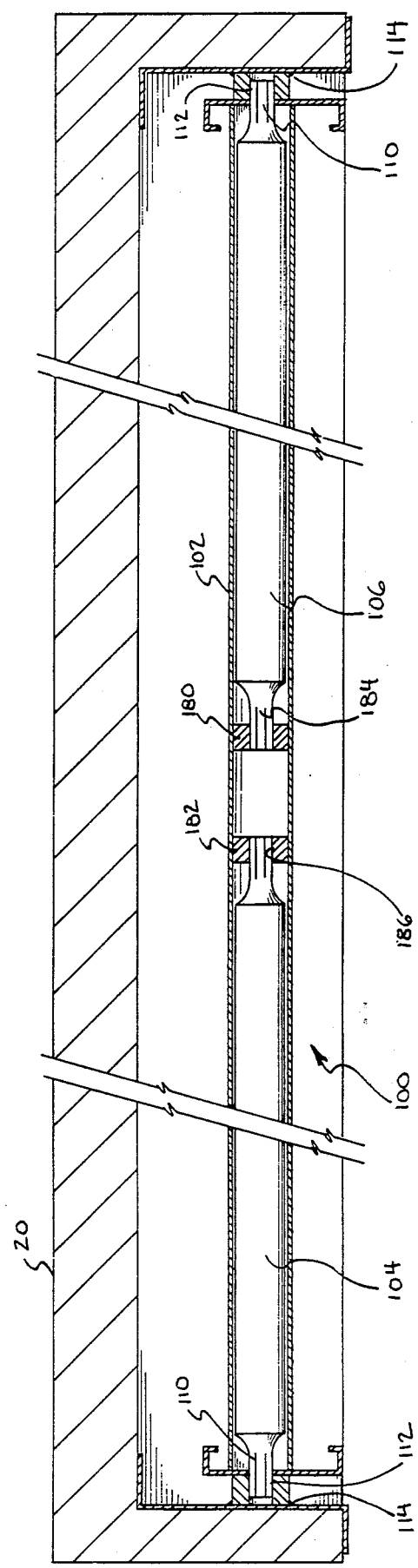
Figure 12:
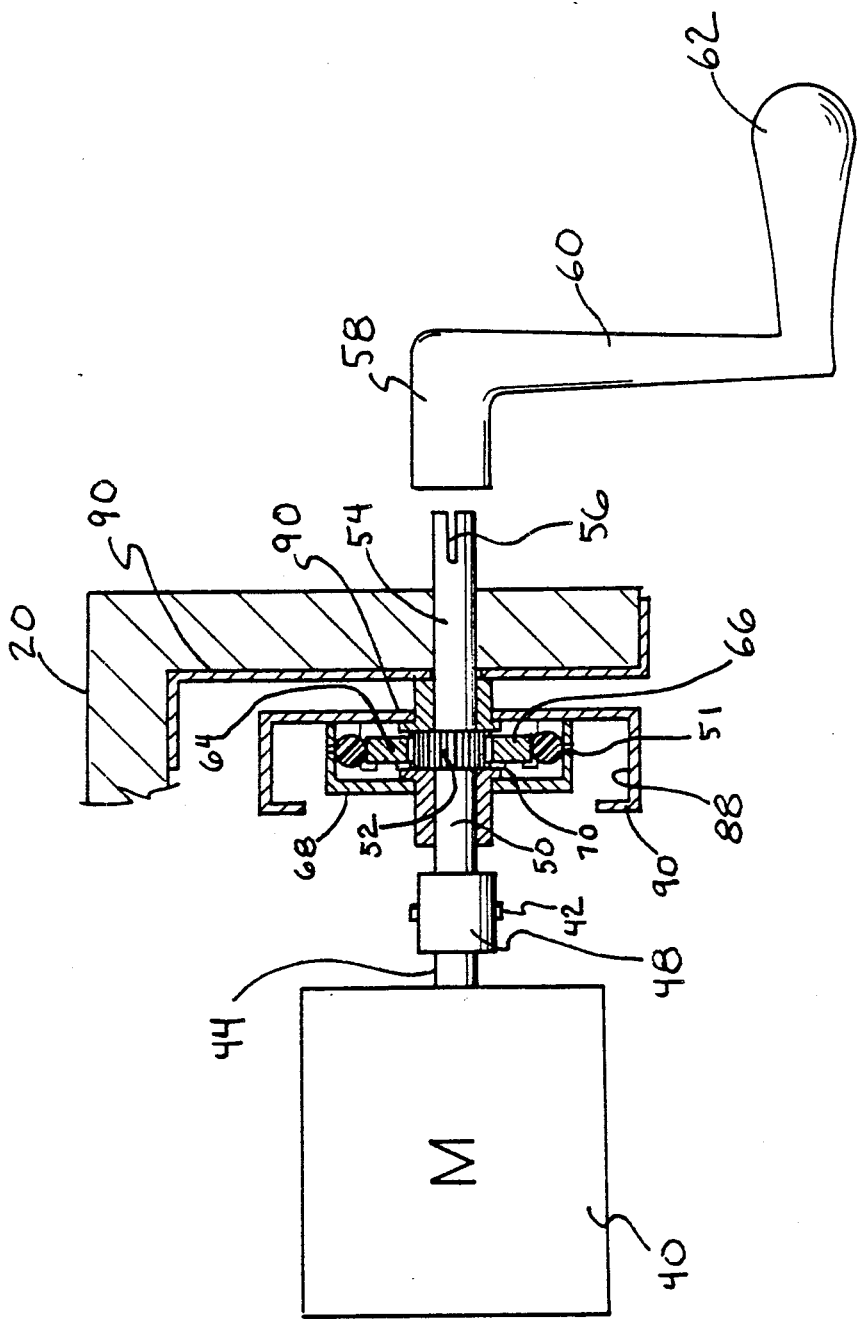

FIG. 10 is an enlarged fragmentary isometric view illustrating as an exploded view a power actuator and manual actuator for effecting the raising and lowering functions, the view being taken of the interior of the vehicle and looking in the direction of one of the corners of the recreational vehicle with the roof broken away, and a part of the bearing structure also broken away;

FIG. 11 is an enlarged detail sectional view of the follower mechanism taken on line 11—11 of FIG. 10;

FIG. 12 is an enlarged sectional detail view taken on line 12—12 of FIG. 10; and, FIG. 13 shows in detail view a further embodiment of the invention in which, instead of an electric motor connecting the actuators at opposite sides of the vehicle, there can be substituted a hydraulic means performing the same function.

DESCRIPTION OF THE PREFERRED EMBODIMENTS

Figure 1:
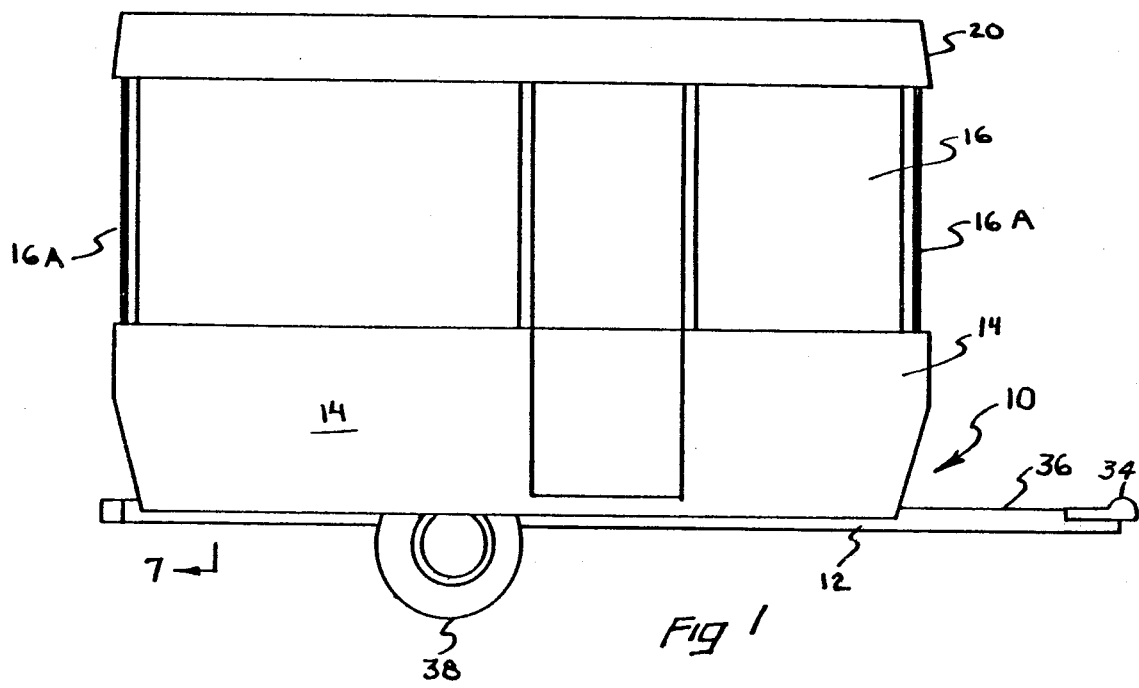
FIG. 1 illustrates in side elevation view a recreational vehicle with the solid walls fully upright and the roof raised to its maximum extent.

A recreational vehicle designated by reference numeral 10, FIGS. 1-6, consists of a frame 12, half-walls 14, and hinged solid side wall panels 16 and 18, pivoted on half-walls 14 so that they can be fully raised in the manner illustrated in FIG. 1 or can be folded entirely inwardly within the outline of the vehicle as illustrated in FIG. 5. The roof 20 can be either elevated in the manner shown in FIG. 1 or fully lowered for transport as shown in FIG. 5.

Thus the roof can travel in either direction, illustrated by the double arrow-headed line 24 in FIG. 3 and the solid side wall panels 16 and 18 are pivoted in either direction as indicated by the double arrow-headed lines 26 (FIG. 4) about hinge connections 28 and 30.

The vehicle has the usual hitch linage 34, drawbar 36 and ground engaging wheels 38, so that the device can readily be towed from place to place by any suitable vehicle such as a passenger car, truck, or the like.

RAISING AND LOWERING MECHANISM

Pivoting of the hinged wall panels and raising and lowering of the roof 20 is effected by an electrically operated power motor 40 having a power shaft 42 with drive pins 44 received in the slot 46 of a drive sleeve 48. The drive sleeve 48 and extension shaft 50 are mounted within a bracket 51 (FIG. 10) so that drive gear wheel 52 is power driven by the motor 40 and can rotate in either clockwise or counterclockwise direction. The power take off shaft 54 has a slotted end 56 making it adapted to be operated by a crank 58 so that the power operation of the motor 40 can be duplicated manually by means of the crank having crank arm 60 and handle 62 usable in case of emergency to duplicate the electric motor functions.

The gear 52 is geared to an upper gear bar 64 and a lower gear bar 66, the teeth 67 in gear bars 64,66 being spaced so that they continuously mesh with the teeth of drive gear 52. Upon rotation of the gear wheel in one direction the two gear bars, 64, 66, are each drawn toward the center of the vehicle, i.e. gear bars are drawn together so that they more closely overlie each other. By counter-rotating the gear 52 the gear bars 64,66 can be spread apart so as to become more colinear. These two opposite directions of gear bar movement will effect the raising and lowering functions of the side wall panels and roof. Each gear bar, 64,66 is slidably supported in a respective channel 68,70 where it finds bearing support (FIG. 10). The distal end 72,74 of each gear bar 64,66 has a pin connection 78,80 (FIG. 10) with a respective shuttle follower 82,84 received for slidable movement within a track 88 of a channel 90 supported along the inner surface 92 of the roof 20.

Each follower 82,84 has a pivoted connection 96,98 with linkage members 16a,18a connected to the solid wall panels 16,18 pivoted at 28 and 30. The solid side wall panels thus swing on their respective pivots between upright usage position and folded-in transport position.

At the side of the vehicle which is opposite that shown in FIG. 10 (i.e. opposite the side associated with motor 40) is an identical set of linkages 16a,18a each of which has a pivoted connection 96,98 with followers 82,84 in a track 88 of a channel 90. Power actuation of one set of linkages 16a,18a is communicated to the other set of linkages 16a,18a and causing them to rotate coordinately with their companion linkages 16a,18a at the opposite side of the vehicle by means of a torsion bar operating mechanism designated generally by reference numeral 100. The torsion bar linkage consists of a tube rod 102 which is turned as the wall panels pivot, and two internal torsion rods 104,106 each of which has a splined connection 110 received within a splined socket 112 secured to the inner corner of the roof 12 at 114. Thus when the wall 18 (FIG. 10) rotates inwardly, the end of torsion rod 106 is held and tube rod 102 is permitted to rotate because of its attachment at 118 and 120 (FIG. 10) with bars 122 and 124 which rotate with the wall 18 and are secured to the wall. Rotation of the sleeve 102 loads each torsion bar 106,104 because each torsion bar is held at its distal end in the roof socket 112, and the proximal end of each torsion bar is splined to an associated internal boss 180,182 (FIG. 11) which is welded to the interior of the tube rod and therefore rotates with the tube rod (102). The stored energy is available for causing the linkage bars 16a,18a at each side to move in unison and also assisting in raising the roof 20 because the torsion bar is loaded during lowering of the roof and folding inwardly of the solid wall panels by the motor 40 and can thereafter assist in raising the roof and pivoting the wall panels to upright position. The torsion bar causes simultaneous operation of all the linkages 16a,18a associated with the two different wall panels 16 and 18 and coordinates the pivotal movement of each wall panel 16,18 as shown in FIGS. 1-6. Each linkage bar 16a,18a is attached to its respective wall panel and is connected to its associated half wall 14 by means of a bearing strap 128 which is wrapped over cylinder bearing 130 (FIG. 8). The bearing 130 has a stub 131 received in the pivoted end of linkage 18a. The mounting section 132 of the strap is secured by bolts 134 to the interior side of half wall 14.

It is important to the invention that there be coordinated with hinged folding movement of the solid side panels 16,18 a vertical movement of the roof 20. This is accomplished in a manner next to be described. At each corner of the roof 20 is a pivot 140 (referring to FIGS. 7, 8, and 9 two of the four roof connections are illustrated at the roof corners). Between each linkage 16a,18a and their respective pivots 140 is a compound linkage 144 and 146 connected by pivots 150 to a mid portion of the linkages 16a,18a . Thus as linkages 16a,18a rotate on hinges 28,30, the compound linkages 144,146 through pivot connections 150 will cause the roof 20 to raise and lower in a precise vertical rectilinear fashion. This is accomplished by carefully selecting $R_1$ (FIG. 8) which is the radius of turning of linkage 18a with the radius $R_2$ which is the turning radius of linkage 146, so that the rotation of linkage 18a and the counter-rotation of compound linkage 146 will cause each corner to be moved along a rectilinear vertical line so that each corner of the roof ascends and descends at the same rate and in the same amount. Thus the roof is precluded from skewing, and thereby causing a resultant binding which would inevitably result from uneven raising or lowering of any one corner or combination of corners with respect to the others.

The described linkage and compound linkage coordinates the folding movement of the solid side panels 16,18 with the raising and lowering movement of the roof 20 so that both occur simultaneously, and in such coordinated fashion that the roof 20 raises and lowers squarely and with each corner always moving co-equally, simultaneously and in precise linear fashion.

OPERATION

In operation, the motor 40 is electrically energized by any suitable switch arrangement which is not part of the present invention. The motor 40 can be battery operated or operated from the generator of the vehicle, all of these expedients being within the teaching of the present invention.

Figure 6:
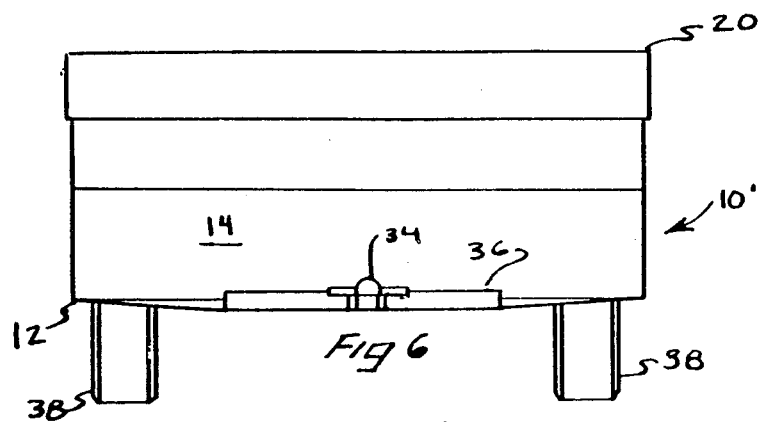

Once the motor 40 is operated, and assuming it is desired to raise the roof 20 and side panels 16,18 from the condition shown in FIGS. 5,6 to that of FIGS. 1,2, the power gear 52 is rotated in such manner as to cause the two gear bars 64,66 to spread apart (from the position of FIG. 9 when they overlie, to the position of FIG. 7 when they are nearly colinear). That is, each gear bar is driven towards its respective corner of the vehicle with the result that gear bar 64 is moved in the direction of the arrow 64(a) (FIG. 10) and gear bar 66 is moved in the direction of the arrow 66(a).

Each gear bar is caused to move the same increment of movement by reason of an idler gear 180 mounted on spindle 182 held by channel 90 and meshing with the gears of both gear bars. As the gear bars are spread in the manner described, they will cause followers 82,84 to move slidably apart within the tracks 88 of the channel 90, gear bars being fastened to these followers through pins 78 and 80.

Each linkage member 16a,18a being attached to the follower 82,84 will then commence upward rotation about its associated bearing support 28,30 on half walls 14. An important feature of the present invention, as clear from FIG. 9, is that on full retracted position, the followers 82,84 engage the opposite edge faces 51a and 51b of bracket 51, so that linear force exerted by the motor and gear bars 64,66 on the linkages 16a,18a is on a line offset by the distance "D" (FIG. 9) from the linkage pivots 28,30 and the linkages 16a,18a will not "lock" in place. Instead, linearly imposed force exerted on the linkages 16a,18a by the gear bars 64,66 and followers 82,86 will develop an effective torque force effecting upward rotation of the linkages 16a,18a.

Figure 4:
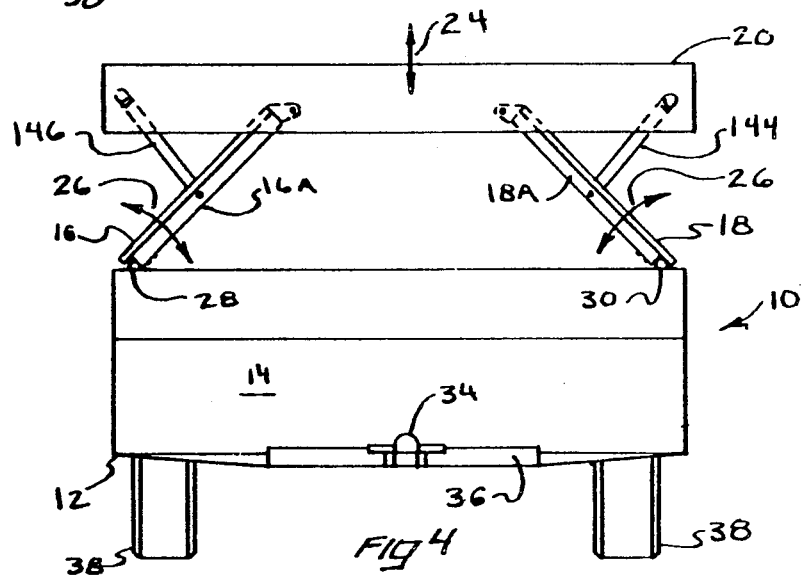

As the linkages 16,18 rotate upwardly, they carry the solid wall panels 16,18 with them, pivoting progressively through the position shown in FIG. 6 to that of FIG. 4 and finally to the full upright position shown in FIG. 2. The linkages 16a,18a movement can also be traced from FIG. 9 to FIG. 8 and then to FIG. 7. Simultaneously, the compound linkages 14a,16a impose lifting force on each corner of the roof 20, successively raising the roof from the full lowered position of FIG. 6 and finally to the full raised position of FIG. 2.

Thus, hinging movement of the wall panels 16,18 from full retraction to full raised position is accompanied simultaneously and in coordinated manner with the raising of roof 20. The pivotal action of the wall panels 16,18 is coordinated with the vertical roof movement 20 by joining the linkage 16a,18a with compound linkages 144 and 146 and coordinating the radius $R_1$ with that of $R_2$ (FIG. 8) so that there is true vertical rectilinear roof movement at each of the corners. All roof corner movements occur simultaneously with the raising action of the solid side panels.

The operation described for raising the roof 20 and bringing to an upright position the wall panel 16,18 is simply reversed when it is desired to bring the vehicle from the condition shown in FIG. 2 to that of FIG. 6; i.e. the linkage is operated from the condition shown in FIG. 7 progressively through that of FIG. 8 into that of FIG. 9, all by the simple expedient of reversing the motor 40 and the drive gear 52, causing the gear bars 64,66 to be drawn together so that they overlie each other.

FURTHER EMBODIMENT

As illustrated in FIG. 13, instead of operating the roof and wall panels with an electric motor, there may be substituted a hydraulic power cylinder 180 supported by sleeves 182 and having a piston rod 184 attached to lever 16a. The extension of the piston rod 184 by pressurizing one of the internal variable volume chambers of cylinder 180 will directly effect turning the power lever 16a and thus operate both levers 16a,18a through the gear bars.

CONCLUSION

The roof and solid side panels of a recreational vehicle can be simultaneously operated, with the solid side panels undergoing pivoted actuation from inwardly folded position to upright position, and simultaneously, by means of a compound linkage the pivoted movement of the solid side panels can be translated to a linear-vertical movement exerted uniformly on each of the four corners of the roof so that the roof is raised and each corner of the roof progresses in like fashion and at a uniform rate. Thus raising and lowering of the roof is directly coordinated with the hinged solid wall panels and all such actions occur in coordinated fashion and without binding at any time. Moreover, the mechanism for accomplishing this may be located within the roof, so as to present as little obstruction as possible and developing maximum utilization of the interior of the recreational vehicle. This promotes a lighter weight construction, and one which will offer as little impedence as possible to extending bed sections, for example, from the front end and rear end of the vehicle once the wall panels and roof are fully extended and raised.

CLAIM SCOPE

While the present invention has been illustrated and described in connection with these selected example embodiments, it will be understood that these are illustrative of the invention and are by no means restrictive thereof. It is reasonable to be concluded that those skilled in the art can make numerous revisions and adaptations of the invention and it is intended that such revisions and adaptations will be included within the scope of the following claims as equivalents of the invention.

We claim:

1. Apparatus for raising and lowering the roof and solid side panels of a recreational vehicle comprising:
   a raising and lowering mechanism disposed at the upper interior edge of the roof on opposite sides thereof;
   means forming a track extending substantially the length of the interior upper roof edge and at opposite sides of said roof;
   oppositely movable gear toothed racks in confronting relation and located for slidable movement within said track means;
   power actuating means having a gear wheel associated with the upper and lower racks and in driving relation with each;
   an idler sprocket also in geared relation with said racks for insuring simultaneous and coequal movement of said racks and whereby said racks can be power actuated in each of opposite directions relative to each other;
   a pivoted lever at each of the four corners of the vehicle and pivotally connected at one end to said vehicle;
   means forming an operative connection between the power driven end of each said levers and said power actuating means whereby movement of said gear racks will effect pivoting of each said levers at its pivoted base end with the vehicle to effect selective directional pivot movement of each such lever;
   a pair of solid wall panels forming opposite sides of said vehicle and operatively connected one with each of a pair of complementary levers, whereby said levers pivot the wall panels between a substantially horizontal stored position to a substantially vertical raised position; and,
   a compound link associate one with each of said levers and having an articulated connection to a mid portion of its associated lever and further having a pivoted connection at the opposite end thereof with a corner of said roof, the radius of movement of each said levers about its connection with the vehicle and the radius of counter pivotal movement of the associated link about its articulated connection with said lever, causing each roof corner to develop coequal simultaneous rectilinear vertical movement of each corner which moves in unison with the others.

2. The apparatus in accordance with claim 1, including torsion bar means extending between two opposite corners of the said roof and disposed slightly above each wall panel at the distal end of its hinged connection with said chassis, said torsion bars being arranged to mechanically interconnect the direct drive pair of levers and the pair of levers at the corners opposite said direct drive levers whereby each such levers are caused to move pivotally in unison and in a coequal amount whereby the articulated compound links associated one with each of said power driven levers translates the hinged movements of each wall panel to a coordinated and simultaneous vertical roof movement.

3. The apparatus in accordance with claim 1, including a follower slidably mounted within said track means and operatively connected one to each of the driven ends of said gear racks, means forming a pivotal connection between each follower and an associated driven end of said levers, abutment means at the mid portion of said track means said followers are engageable with said abutment at the fully retracted position of said follower and solid wall panels the said levers are disposed at an angular disposition relative to their associated pivot mountings, whereby rectilinear force imparted by such actuating means will effect a torque force on each said levers effective to initiate raising movement of said levers from their maximum retracted position to successively raising positions.

4. The apparatus in accordance with claim 1 in which said actuating mechanism is disposed within the interior roof so that the vertical roof movement is coordinated with the angular position of said levers whereby said levers are continuously actuatable by a rectilinear actuating force and said levers are continuously free to pivot unimpededly about their associated pivot connections with the chassis.

5. In a recreational vehicle having a raisable roof and folding solid side wall panels, a process for selectively raising and lowering the roof structure and concurrently selectively pivoting inwardly and outwardly the solid wall panels which are hingedly joined at their base end, comprising the steps of;
   mounting a power actuator within the interior surface of a vertically raisable and lowerable roof;
   communicating rectilinear movement effected by said power means to each of a plurality of pivotally moveable levers disposed one at each of the corners of said vehicle to effect pivoted movement of said wall panels to which they are attached;
   connecting a mid portion of each of said levers to a respective corner of said roof through a compound linkage whereby pivotal movement of said levers by said actuator effects simultaneous and coordinated wall panel movement and said roof is simultaneously raised by a co-equal amount at each of said corners through the articulated connection between each such corner and the associated compound linkages.

6. The process for raising and lowering roof structures and wall panels in accordance with the claim number 5 including the step of operating pivoted levers associated with a respective wall panel through a yieldable spring means whereby power operation of a single pair of said levers associated one with each of said wall panels, will effectively drive all of said levers in a pivotal direction and in unison.

7. The process in accordance with claim 6, including the step of manually operating the directly-operated pair of levers associated one with each of said wall panels in one of a selected raising and lowering directions; and,
   concurrently effecting a simultaneous coordinated vertical movement of said roof through the articulated compound linkages connecting each roof corner and a mid portion of a respective one of said pivoted levers.

8. The apparatus in accordance with claim 1 including a chassis having ground-supporting wheels whereby the vehicle can be transported.

9. The apparatus in accordance with claim 1 including hydraulic means for interconnecting said levers, whereby the directly operated levers will impart concurrent movement to all the levers through said hydraulic means.

* * * * *